United States Patent
Sun et al.

(10) Patent No.: US 10,065,589 B2
(45) Date of Patent: Sep. 4, 2018

(54) SYSTEMS AND METHODS FOR DETECTING A COLLISION

(71) Applicants: Denso International America, Inc., Southfield, MI (US); DENSO CORPORATION, Kariya (JP)

(72) Inventors: Bo Sun, Farmington Hills, MI (US); Katsuhiko Akamatsu, West Bloomfield, MI (US)

(73) Assignees: DENSO International America, Inc., Southfield, MI (US); DENSO CORPORATION, Kariya, Aichi-pref. (JP)

( * ) Notice: Subject to any disclaimer, the term of this patent is extended or adjusted under 35 U.S.C. 154(b) by 26 days.

(21) Appl. No.: 14/936,895

(22) Filed: Nov. 10, 2015

(65) Prior Publication Data

US 2017/0129434 A1    May 11, 2017

(51) Int. Cl.
*B60R 21/013* (2006.01)
*B60W 30/095* (2012.01)
(Continued)

(52) U.S. Cl.
CPC .......... *B60R 21/013* (2013.01); *B60W 30/095* (2013.01); *B60K 2031/0016* (2013.01);
(Continued)

(58) Field of Classification Search
CPC ........ B60R 21/013; B60R 2021/01013; B60R 2021/0002–2021/0004; B60R 2021/01204–2021/01211; B60R 2021/01231; B60R 2021/01308; B60R 2021/01313; B60R 21/017; B60R 21/16; B60R 21/01; B60W 30/095
(Continued)

(56) References Cited

U.S. PATENT DOCUMENTS 6,327,527 B1 * 12/2001 Imai ...................... B60R 21/013
                                                                280/735
9,033,367 B2 *  5/2015 Fukawatase ........ B60R 21/0136
                                                                180/274
(Continued)

FOREIGN PATENT DOCUMENTS

JP    2000-296755 A    10/2000
JP    2005-028992 A    2/2005
(Continued)

OTHER PUBLICATIONS

"Chevrolet Sonic Earns 2015 Top Safety Pick after midyear changes", May 7, 2015, IIHS News <http://www.iihs.org/iihs/news/desktopnews/chevrolet-sonic-earns-2015-top-safety-pick-after-midyear-changes> accessed May 22, 2017 2:58:14 PM.*

*Primary Examiner* — Genna M Mott
(74) *Attorney, Agent, or Firm* — Harness, Dickey & Pierce, P.L.C.

(57) ABSTRACT

A method for setting activation parameters for a vehicle safety system of a subject vehicle. The method includes determining whether a collision between a subject vehicle and an object is imminent or in progress. Whether the collision will be a front small overlap collision is determined, and activation parameters of a vehicle safety system are set in a front small overlap collision mode if the collision is determined to be a front small overlap collision.

18 Claims, 4 Drawing Sheets

(51) Int. Cl.
*B60R 21/01* (2006.01)
*B60R 21/00* (2006.01)
*B60K 31/00* (2006.01)

(52) U.S. Cl.
CPC .............. *B60R 2021/0004* (2013.01); *B60R 2021/0023* (2013.01); *B60R 2021/01013* (2013.01); *B60R 2021/01231* (2013.01); *B60W 2420/52* (2013.01); *B60W 2540/18* (2013.01); *B60W 2550/10* (2013.01)

(58) Field of Classification Search
USPC ........................................................ 701/45
See application file for complete search history.

(56) References Cited

U.S. PATENT DOCUMENTS

| | | | | |
|---|---|---|---|---|
| 2005/0125127 | A1* | 6/2005 | Bomar, Jr. | G06Q 99/00 701/45 |
| 2006/0047388 | A1* | 3/2006 | Oka | B60R 21/013 701/41 |
| 2008/0269990 | A1* | 10/2008 | Ghannam | B60R 21/0134 701/45 |
| 2012/0101688 | A1* | 4/2012 | Sugiyama | B60R 21/18 701/45 |
| 2014/0375036 | A1* | 12/2014 | Fukawatase | B60R 21/0136 280/732 |
| 2015/0109444 | A1* | 4/2015 | Zhang | B60Q 9/008 348/148 |
| 2015/0266439 | A1* | 9/2015 | Foo | B60R 21/0132 701/45 |
| 2015/0343977 | A1* | 12/2015 | Jeong | B60R 21/0132 701/45 |

FOREIGN PATENT DOCUMENTS

| | | |
|---|---|---|
| JP | 2007-279892 A | 10/2007 |
| JP | 2008-143447 A | 6/2008 |
| JP | 2010023606 A | 2/2010 |
| JP | 2011-195073 A | 10/2011 |
| KR | 20160042231 A * | 4/2016 |
| KR | 20160048445 A * | 5/2016 |
| KR | 20160048446 A * | 5/2016 |

* cited by examiner

SYSTEMS AND METHODS FOR DETECTING A COLLISION

FIELD

The present disclosure relates to systems and methods for detecting a collision.

BACKGROUND

This section provides background information related to the present disclosure, which is not necessarily prior art.

While current vehicle safety systems are suitable to protect vehicle occupants in the event of a collision, they are subject to improvement. For example, improved methods and systems would be desirable for distinguishing between, and customizing vehicle safety systems for responding to: a front head-on impact in which most if not all impact force is at or proximate to a front center portion of the vehicle; and a front small overlap impact in which most if not all impact force is offset from the front center portion of the vehicle. The Insurance Institute for Highway Safety (IIHS) recently started front small overlap impact crash tests, and rating vehicles on their ability to withstand such crash tests. The present teachings advantageously address these and other needs in the art.

SUMMARY

This section provides a general summary of the disclosure, and is not a comprehensive disclosure of its full scope or all of its features.

The present teachings provide for methods and systems for setting activation parameters of a vehicle safety system. For example, the present teachings provide a method that includes the following: determining whether a collision between a subject vehicle and an object is imminent or in progress; determining whether the collision is or will be a front small overlap collision; and setting activation parameters of a vehicle safety system in a front small overlap collision mode if the collision is determined to be a front small overlap collision.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of select embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
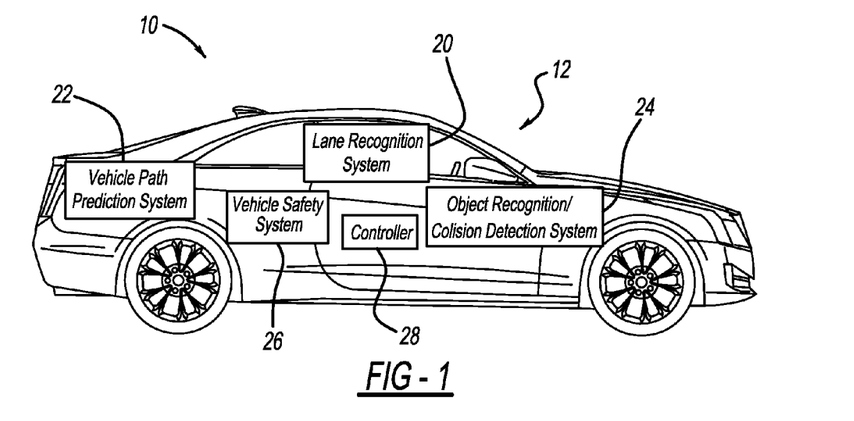
FIG. 1 illustrates a vehicle including a system according to the present teachings for setting activation parameters of a vehicle safety system.

With initial reference to FIG. 1, a vehicle 10 including a system 12 according to the present teachings is illustrated. Although the vehicle 10 is illustrated as an automobile in exemplary FIG. 1, the present teachings apply to any other suitable vehicle, such as a sport utility vehicle (SUV), a mass transit vehicle (such as a bus), or a military vehicle, for example. The system 12 according to the present teachings generally includes the following features, each of which are described in detail herein and can be provided at any suitable location throughout the vehicle 10: a lane recognition system 20; a vehicle path prediction system 22; an object recognition/collision detection system 24; a vehicle safety system 26; and a controller 28. The controller 28 can be any controller suitable for operating the systems 20, 22, 24, and 26, as well as receive inputs from the systems 20, 22, 24, and 26 in order to determine whether to set the vehicle safety system 26 in a front small overlap collision mode.

The controller 28 can be any suitable controller for controlling one or more of the lane recognition system 20, the vehicle path prediction system 22, the object recognition/collision detection system 24, and the vehicle safety system 26. In this application, including the definitions below, the terms "controller" and "system" may refer to, be part of, or include processor hardware (shared, dedicated, or group) that executes code and memory hardware (shared, dedicated, or group) that stores code executed by the processor hardware. The code is configured to provide the features of the controller, systems, and methods described herein.

The lane recognition system 20 can be any suitable system including any suitable components configured to determine the position of the subject vehicle 10 relative to lanes of a road. The lane recognition system 20 can be configured to identify the lanes of the road and the location of the subject vehicle 10 relative thereto in any suitable manner, such as with one or more sensors, for example. Any suitable sensors can be used, such as one or more cameras configured to identify lane markings painted on a road and position of the subject vehicle 10 relative thereto. The sensors can be located at any suitable position about the subject vehicle 10, such as at a front portion thereof.

The vehicle path prediction system 22 is configured to identify a predicted path of travel (illustrated in FIGS. 4A-4D at 320, for example) of the subject vehicle 10 in any suitable manner. For example, the vehicle path prediction system 22 is configured to receive inputs from any suitable sensors positioned throughout the vehicle 10 that are configured to provide steering angle, heading, and yaw rate information of the vehicle 10, such as one or more accelerometers, wheel speed sensors, etc. The vehicle path prediction system 22 is further configured to identify a curve radius R of the predicted path of travel 320 of the subject vehicle 10, as explained further herein.

The object recognition/collision detection system 24 is configured to identify objects in the predicted path of travel 320 of the subject vehicle 10, as well as detect any impact with such objects, in any suitable manner. For example, the object recognition/collision detection system 24 can include one or more suitable sensors configured to identify objects that may pose a collision hazard, as well as to detect impact location in the event an actual collision. For example, the sensors can include any suitable input sensors, proximity sensors, accelerometers, cameras, radar, etc. The sensors can be located across a front of the subject vehicle 10 and extend to sides thereof in order to facilitate determining the location of the impact, such as whether the impact is a front head-on impact or a front small overlap impact in which the impact is offset from a center of a front of the subject vehicle 10, such as at front corners of the vehicle 10.

The vehicle safety system 26 includes any suitable safety systems and/or devices of the subject vehicle 10, such as airbags, seat belt tensioners (pretensioners), active head restraints, etc. The components of the vehicle safety system 26 can be configured to activate at a predetermined time subsequent to a collision, and/or at a predetermined intensity or force, as set by the controller 28 for example.

The controller 28 is configured to set activation parameters of the different components of the vehicle safety system 26 based on whether or not the controller 28 determines a collision to be a front small overlap collision. For example, if based on inputs from the systems 20, 22, and/or 24 the controller 28 determines that the subject vehicle 10 is involved in a front small overlap collision, the controller 28 will set activation parameters of one or more components of the vehicle safety system 26 to be different from when a collision other than a front small overlap collision is detected, such as a front head-on collision. For example, when a front small overlap collision is detected, the controller 28 can set one or more components of the vehicle safety system 26 to activate sooner as compared to when a collision other than a front small overlap collision is detected, such as when a front head-on collision is detected. Activation parameters of the vehicle safety system 26 can be set to respond to a front head-on collision in a default mode. The controller 28 can be configured to maintain the vehicle safety system in the default mode unless another type of collision is detected, such as a front small overlap collision.

Figure 2:
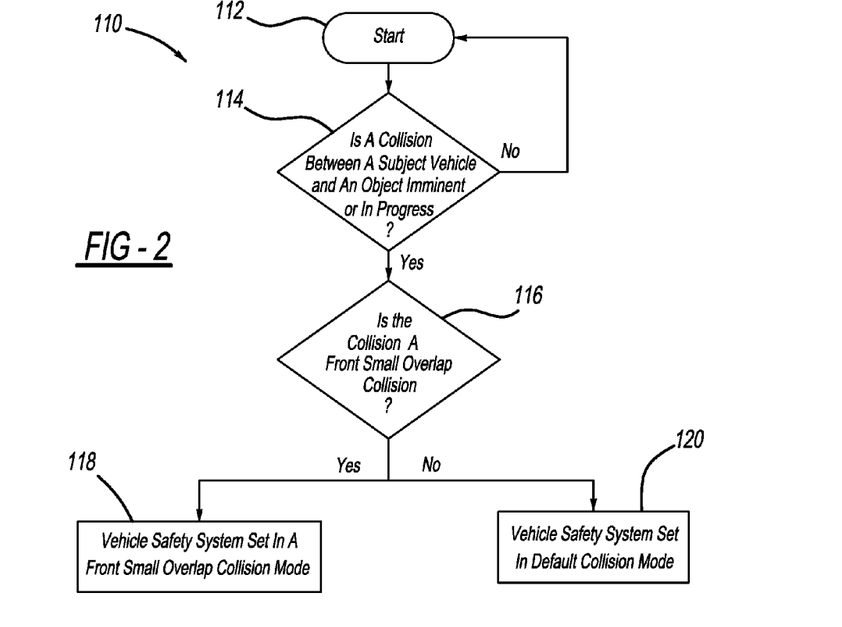
FIG. 2 illustrates a method according to the present teachings for setting activation parameters of a vehicle safety system.

With continued reference to FIG. 1, and additional reference to FIG. 2, a method according to the present teachings for setting activation parameters of the vehicle safety system 26 is generally illustrated at reference numeral 110. The method 110 starts at block 112 where the controller 28 is in receipt of inputs from the systems 20, 22, and 24. At block 114, based on the inputs from the systems 20, 22, and 24, the controller 28 determines whether a collision between the subject vehicle 10 and another object is imminent or in progress. If no collision is imminent or in progress, the method 110 returns to block 112, and the controller 28 continues to monitor inputs from the systems 20, 22, and 24 for a collision. If at block 114 the controller 28 determines that a collision is imminent or occurring, the method 110 proceeds to block 116.

At block 116, the controller 28 determines whether the collision will be or is a front small overlap collision, or some other type of collision, such as a full head-on collision. The type of collision can be determined in any suitable manner. For example, if the lane recognition system 20 determines that the subject vehicle 10 has departed from its intended lane 314 of travel, such as by using a lane recognition camera of the lane recognition system 20, and the vehicle path prediction system 22 identifies a predicted path of the vehicle 10 to gradually curve towards an obstacle, such as secondary vehicle 322A in opposing lane of travel 316 (FIG. 4C) or pole 322B (FIG. 4D), the controller 28 can be configured to determine that a small overlap collision is imminent or in progress. Impact sensors of the object recognition/collision detection system 24 positioned at the front of the subject vehicle 10 can also be used to help determine where the impact is taking place.

If the controller 28 determines that a small overlap collision is imminent or in progress, the method 110 proceeds to block 118. At block 118 the controller 28 sets the vehicle safety system 26 in a front small overlap collision mode in which activation parameters (such as activation time, force, etc.) are customized in any suitable manner to best protect occupants during a front small overlap collision. For example, a crash detection threshold can be lowered if it is determined that the collision is or will be a small overlap collision, which will typically result in the vehicle safety system being activated earlier (i.e., airbags, safety belt tensioners, and active head restraints will be activated earlier). If at block 116 the controller 28 determines that the collision is not a front small overlap collision, the method 110 proceeds to block 120 where activation parameters of the vehicle safety system 26 remain at a default setting, or are set by the controller 28 to a default setting. In the default setting the activation parameters of the vehicle safety system 26 can be set to best accommodate a front head-on collision, or any other type of collision other than a front small overlap collision.

Figure 3:
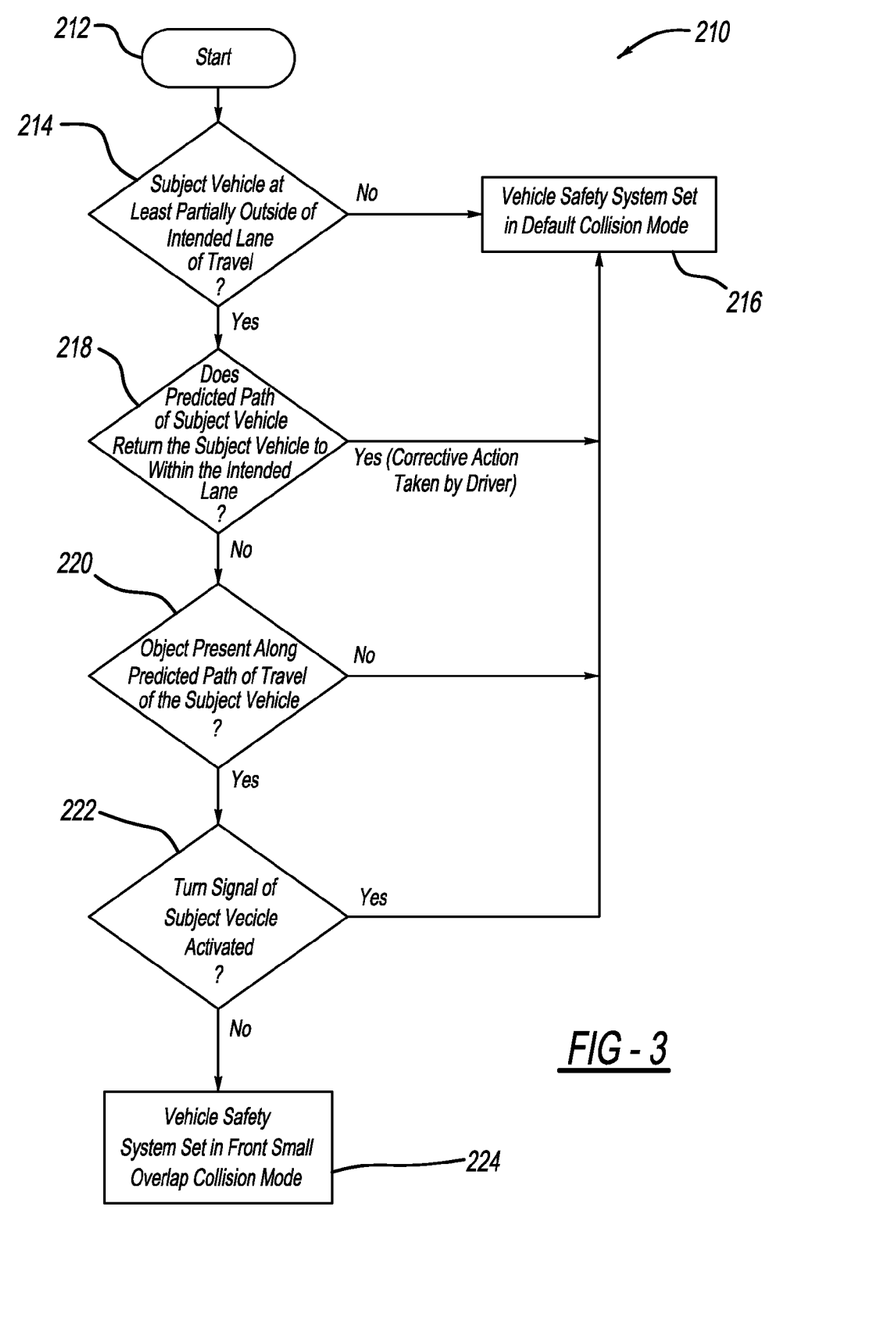
FIG. 3 illustrates another method according to the present teachings for setting activation parameters for a vehicle safety system.
Figures 4A, 4B:
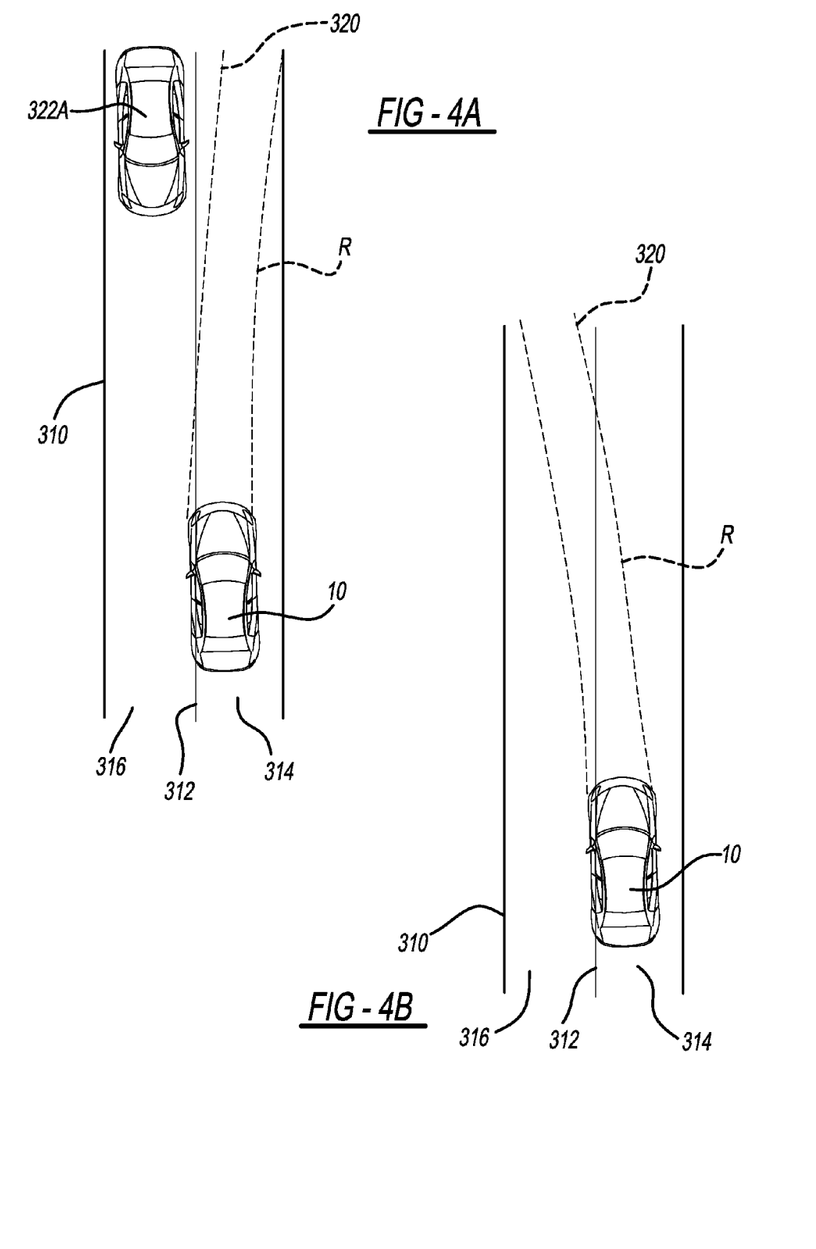
FIG. 4A illustrates a driving situation where a vehicle safety system of a subject vehicle is set in a default collision mode because although the subject vehicle has departed from its intended lane, the driver of the subject vehicle has taken corrective action to steer the subject vehicle back into its intended lane of travel so as to avoid a secondary vehicle.
FIG. 4B illustrates a driving situation in which the vehicle safety system of the subject vehicle is set in a default collision mode because although the subject vehicle has departed from its intended lane of travel, no object has been detected in the predicted path of travel by a vehicle path prediction system of the subject vehicle.
Figures 4C, 4D:
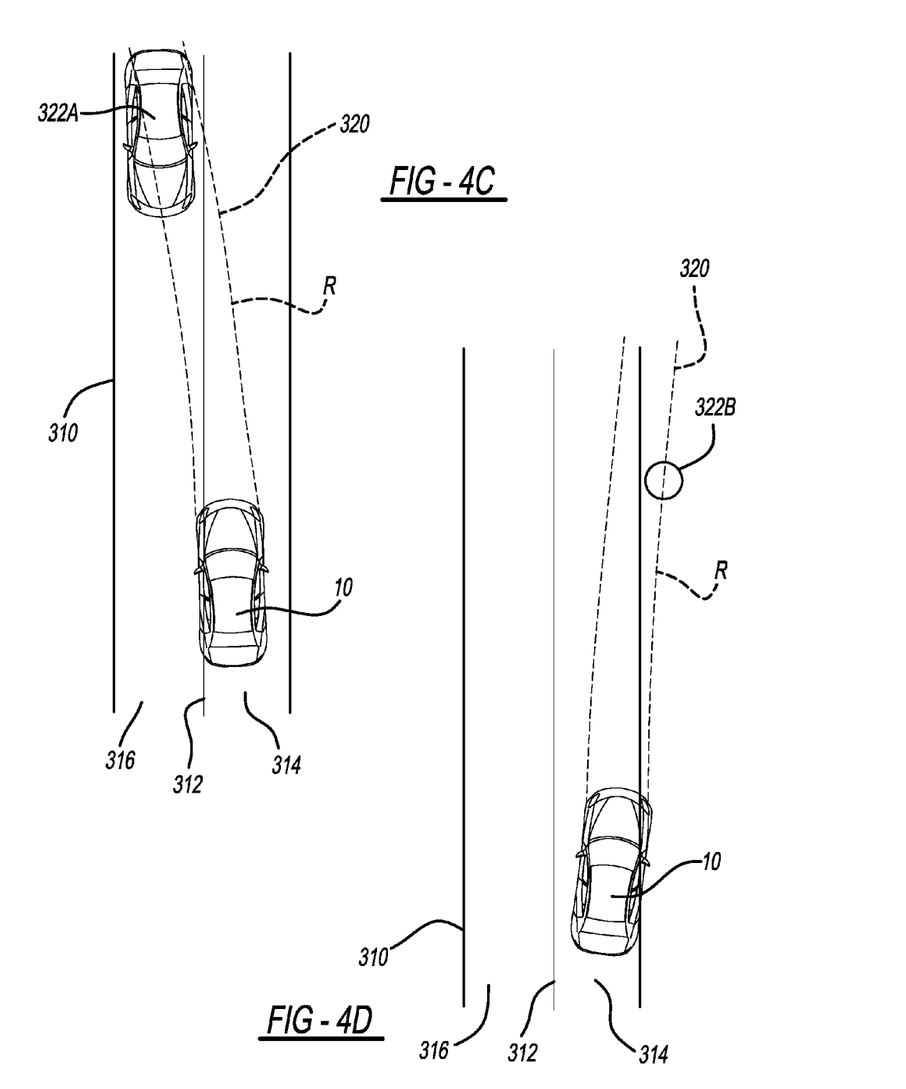
FIG. 4C illustrates a driving situation in which the vehicle safety system of the subject vehicle is set to a front small overlap collision mode because a lane recognition system of the subject vehicle has determined that the subject vehicle has, or at least partially has, strayed from its intended lane of travel, and a vehicle path prediction system of the subject vehicle has predicted that the subject vehicle will continue to travel outside of the intended lane of travel along a curve radius that will direct the subject vehicle to contact a secondary vehicle at about a front left-hand corner of the subject vehicle resulting in a front small overlap collision.
FIG. 4D illustrates a driving situation in which the vehicle safety system of the subject vehicle is set to a front small overlap collision mode because a lane recognition system of the subject vehicle has determined that the subject vehicle has, or at least partially has, strayed from its intended lane of travel, and the vehicle path prediction system of the subject vehicle has predicted that the subject vehicle will continue to travel outside of the intended lane of travel along a curve radius that will direct the subject vehicle to contact a poll at a front right-hand corner of the subject vehicle resulting in a front small overlap collision.

With additional reference to FIGS. 3 and 4A-4D, another method 210 according to the present teachings for setting activation parameters of the vehicle safety system 26 will now be described. The method 210 starts at block 212 where the controller 28 is in a standby mode and in receipt of inputs form the systems 20, 22, and 24. At block 214, the controller 28 determines based on inputs from the lane recognition system 20 whether the subject vehicle 10 is at least partially outside of an intended lane of travel. For example and with reference to FIG. 4A, the subject vehicle 10 is illustrated on road 310, which includes a center line 312 dividing the road 310 into an intended lane of travel 314 of the subject vehicle 10 and an opposing lane of travel 316. A predicted path of travel of the subject vehicle 10 as determined by the vehicle path prediction system 22 is illustrated at reference numeral 320. The predicted path 320 has a curve radius R. An object, which may pose a collision hazard, is illustrated at reference numeral 322. In the example of FIG. 4A, the object 322 is another vehicle (which may be referred to herein as a secondary vehicle).

Thus at block 214, if the lane recognition system 20 determines that the subject vehicle 10 is not at least partially outside of the intended lane 314, such as by using a camera of the lane recognition system 20 configured to determine the location of the subject vehicle 10 relative to the lanes 314 and 316, the method 210 proceeds to block 216. At block 216 the controller 28 sets the vehicle safety system 26 in the default collision mode, in which the vehicle safety system 26 can be configured to accommodate a front head-on collision for example.

If at block 214 the controller 28 determines that the subject vehicle 10 is at least partially outside of the intended lane 314, the method 210 proceeds to block 218. At block 218, the controller 28 determines whether the predicted path 320 of the subject vehicle 10 returns the subject vehicle 10 to within the intended lane 314. The predicted path 320 and curve radius R thereof can be determined in any suitable manner, such as with the vehicle path prediction system 22 described above. If the predicted path 320 returns the subject vehicle 10 to within the intended lane 314, as illustrated in FIG. 4A, the driver of the subject vehicle 10 is determined to have taken corrective action to steer the subject vehicle 10 back to within the intended lane 314 so as to avoid oncoming vehicles, such as the object 322. The method 210 will then proceed to block 216 where the controller 28 sets the vehicle safety system 26 in, or keeps the vehicle safety system 26 set in, the default collision mode. If at block 218 the controller 28 determines that the predicted path 320 does not return the subject vehicle 10 to within the intended lane 314, as illustrated in FIG. 4B, the method 210 proceeds to block 220.

At block 220, the controller 28 determines whether an object that may pose a collision threat with the subject vehicle 10 is present along the predicted path 320 of travel of the subject vehicle 10. The controller 28 makes this determination in any suitable manner, such as based on inputs from the object recognition/collision detection system 24. The object recognition/collision detection system 24 is configured to identify objects that may pose a collision threat in any suitable manner, such as by using cameras, proximity sensors, accelerometers, radar, etc. If at block 220 the controller 28 determines that no object is present along the predicted path 320 of the subject vehicle 10, as illustrated in FIG. 4B, the method 210 proceeds to block 216 where the controller 28 sets the vehicle safety system in the default collision mode.

If at block 220 the controller 28 identifies an object 322 that poses a collision threat (illustrated in FIG. 4C as a secondary vehicle 322A, and illustrated in FIG. 4D as a pole 322B), the method 210 proceeds to block 222. If no object 322 is detected, the method proceeds to block 216 where the controller 28 sets the vehicle safety system in the default collision mode.

At block 222, the controller 28 determines whether or not a turn signal of the subject vehicle 10 has been activated, such as to indicate that the subject vehicle 10 intentionally departed from the intended lane of travel 314 in order to make a turn or to pull over. If the turn signal of the subject vehicle 10 has been activated, the method 210 proceeds to block 216. If at block 222 the turn signal has not been activated, the method 210 proceeds to block 224. At block 224 the controller 28 sets the vehicle safety system 26 in the front small overlap collision mode. As explained above, in the front small overlap collision mode the components of the vehicle safety system 26 (such as the air bags, active head restraints, safety belt tensioners, etc.) are set in any suitable manner to best accommodate a front small overlap collision. For example, a crash detection threshold of the system 12 can be lowered, thus resulting in activation of the vehicle safety system 26 (and one or more of the airbags, safety belt tensioners, and active head restraints thereof) sooner after a collision takes place, as compared to a front head-on collision for example.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method for setting activation parameters for a vehicle safety system of a subject vehicle comprising:
    determining whether a collision between the subject vehicle and an object is imminent or in progress;
    determining whether the subject vehicle has departed from its intended lane of travel, determining whether the object is present along a predicted path of travel of the subject vehicle outside of its intended lane of travel of the subject vehicle, and determining whether a turn signal of the subject vehicle has been activated; and
    setting activation parameters of the vehicle safety system of the subject vehicle in a front small overlap collision mode when the subject vehicle is detected as having departed from its intended lane of travel, the predicted path of travel of the subject vehicle extends outside of the intended lane of travel, the object is detected within the predicted path of travel, and the turn signal of the subject vehicle has not been activated.

2. The method of claim 1, further comprising determining whether the collision is imminent or in progress using at least one of the following: a lane recognition system of the subject vehicle; a vehicle path prediction system of the subject vehicle; and an object recognition/collision detection system of the subject vehicle.

3. The method of claim 1, further comprising determining whether the collision will be, or is, front head-on or front small overlap using at least one of the following: a lane recognition system of the subject vehicle; a vehicle path prediction system of the subject vehicle; and an object recognition/collision detection system of the subject vehicle.

4. The method of claim 1, wherein setting activation parameters of the vehicle safety system of the subject vehicle includes setting at least airbag deployment time.

5. The method of claim 4, further comprising setting the airbag deployment time such that the airbag deploys sooner after a collision when the vehicle safety system is in the front small overlap collision mode as compared to a front head-on collision mode.

6. The method of claim 1, further comprising setting an airbag of the subject vehicle to deploy at a first time subsequent to the collision, or at a second time subsequent to the collision that is different from the first time based on whether the collision is determined to be a front head-on collision or a front small overlap collision.

7. The method of claim 1, further comprising setting the activation parameters of the vehicle safety system in a front head-on collision mode when:
    the subject vehicle is within its intended lane of travel; or
    the subject vehicle has departed from its intended lane of travel, and the predicted path of travel of the subject vehicle extends back inside the intended lane of travel; or
    the subject vehicle has departed from its intended lane of travel, the predicted path of travel of the subject vehicle extends back inside the intended lane of travel, and no object is within the predicted path of travel; or
    the subject vehicle has departed from its intended lane of travel, the predicted path of travel of the subject vehicle extends back inside the intended lane of travel, an object is within the predicted path of travel, and the turn signal of the subject vehicle is active.

8. A method for setting activation parameters for a vehicle safety system of a subject vehicle comprising:
    determining whether the subject vehicle has at least partially exited an intended lane of travel;
    determining a predicted path of travel of the subject vehicle;
    determining whether an object is present along the predicted path of travel of the subject vehicle outside of the intended lane of travel;
    determining whether a turn signal of the subject vehicle is activated; and
    setting the activation parameters of the vehicle safety system in a front small overlap collision mode when the subject vehicle is detected as having departed from its intended lane of travel, the predicted path of travel of the subject vehicle extends outside of the intended lane of travel, an object is detected within the predicted path of travel, and the turn signal of the subject vehicle has not been activated;
    wherein in a front head-on collision mode an airbag of the subject vehicle is set to deploy at a first time after a collision, and in the front small overlap collision mode the airbag of the subject vehicle is set to deploy at a second time that is different from the first time.

9. The method of claim 8, further comprising determining whether the subject vehicle has at least partially exited the intended lane of travel with a camera of a lane recognition system.

10. The method of claim 8, further comprising determining the predicted path of travel of the vehicle based on a steering angle of the subject vehicle.

11. The method of claim 8, further comprising determining whether the object is present along the predicted path of travel of the vehicle with an object recognition system of the subject vehicle including at least one of a camera, radar, and a proximity sensor.

12. The method of claim 8, further comprising setting the activation parameters of the vehicle safety system in the front head-on collision mode when:
    the subject vehicle is within its intended lane of travel; or the subject vehicle has departed from its intended lane of travel, and the predicted path of travel of the subject vehicle extends back inside the intended lane of travel; or the subject vehicle has departed from its intended lane of travel, the predicted path of travel of the subject vehicle extends back inside the intended lane of travel, and no object is within the predicted path of travel; or the subject vehicle has departed from its intended lane of travel, the predicted path of travel of the subject vehicle extends back inside the intended lane of travel, an object is within the predicted path of travel, and the turn signal of the subject vehicle is active.

13. A system for setting activation parameters for a vehicle safety system of a subject vehicle comprising:
  a lane recognition system configured to determine whether the subject vehicle has at least partially exited an intended lane of travel;
  a vehicle path prediction system configured to determine a predicted path of travel of the subject vehicle;
  an object recognition system configured to determine whether an object is present along the predicted path of travel of the vehicle outside of the intended lane of travel;
  a controller configured to determine whether a collision involving the vehicle is a front head-on collision type or a front small overlap collision type based on at least one of the following: whether the subject vehicle has at least partially exited the intended lane of travel, whether the object is present along the predicted path of travel of the vehicle outside of the intended lane of travel, and whether the turn signal of the subject vehicle has been activated;
  wherein:
    the controller is configured to activate a front head-on collision mode or a front small overlap collision mode based on whether the controller determines the collision to be the front head-on collision type or the front small overlap collision type;
    the controller activates the front small overlap collision mode when the subject vehicle is detected as having departed from its intended lane of travel, the predicted path of travel of the subject vehicle extends outside of the intended lane of travel, the object is detected within the predicted path of travel, and the turn signal of the subject vehicle has not been activated; and
    the controller is configured to set an airbag to deploy at a first time after a collision in the front head-on collision mode, and set the airbag to deploy at a second time after a collision in the front small overlap collision mode, the first time is different from the second time.

14. The system of claim 13, wherein the lane recognition system includes at least one camera configured to identify location of vehicle lanes on a roadway.

15. The system of claim 13, wherein the vehicle path prediction system includes at least one of a steering angle sensor and a yaw rate sensor.

16. The system of claim 13, wherein the object recognition system includes at least one of a camera, radar, proximity sensor, and accelerometer.

17. The system of claim 13, wherein the controller is configured to activate the front head-on collision mode when:
  the subject vehicle is within its intended lane of travel; or
  the subject vehicle has departed from its intended lane of travel, and the predicted path of travel of the subject vehicle extends back inside the intended lane of travel; or
  the subject vehicle has departed from its intended lane of travel, the predicted path of travel of the subject vehicle extends back inside the intended lane of travel, and no object is within the predicted path of travel; or
  the subject vehicle has departed from its intended lane of travel, the predicted path of travel of the subject vehicle extends back inside the intended lane of travel, an object is within the predicted path of travel, and the turn signal of the subject vehicle is active.

18. A method for setting activation parameters for a vehicle safety system of a subject vehicle comprising:
  determining whether the subject vehicle has at least partially exited an intended lane of travel;
  determining a predicted path of travel of the subject vehicle;
  determining whether an object is present along the predicted path of travel of the subject vehicle outside of the intended lane of travel;
  determining whether a turn signal of the subject vehicle is activated; and
  setting activation parameters of the vehicle safety system of the subject vehicle to a front small overlap collision mode when both of the following conditions are met:
    (1) the subject vehicle has at least partially exited the intended lane of travel, and
    (2) the object is present along the predicted path of travel of the subject vehicle outside of the intended lane of travel;
  wherein in the front small overlap collision mode, an airbag of the subject vehicle is set to deploy at a time that is different from a non-front small overlap collision mode.

* * * * *

UNITED STATES PATENT AND TRADEMARK OFFICE
CERTIFICATE OF CORRECTION

PATENT NO. : 10,065,589 B2
APPLICATION NO. : 14/936895
DATED : September 4, 2018
INVENTOR(S) : Bo Sun et al.

It is certified that error appears in the above-identified patent and that said Letters Patent is hereby corrected as shown below:

On the Title Page

Column 1, (71) Applicants, Line 3, Delete "Kariya" and insert --Kariya, Aichi-pref.-- therefor In the Claims Column 7, Line 53, In Claim 2, after "following:", insert --¶--

Column 7, Line 54, In Claim 2, after "vehicle;", insert --¶--

Column 7, Line 55, In Claim 2, after "and", insert --¶--

Column 7, Line 59, In Claim 3, after "following:", insert --¶--

Column 7, Line 60, In Claim 3, after "vehicle;", insert --¶--

Column 7, Line 61, In Claim 3, after "and", insert --¶--

Signed and Sealed this
Twenty-first Day of May, 2019

Andrei Iancu
*Director of the United States Patent and Trademark Office*